(12) United States Patent
Lin et al.

(10) Patent No.: US 11,432,091 B2
(45) Date of Patent: Aug. 30, 2022

(54) NON-DISPENSING MANUFACTURING PROCESS FOR MAKING SPEAKER AND SPEAKER THEREOF

(71) Applicant: Tymphany Acoustic Technology Limited, Taipei (TW)

(72) Inventors: Hung Chi Lin, Taipei (TW); Chih Ming Fan, Taipei (TW); Ping Ting Tsao, Taipei (TW); Ling Li, Taipei (TW)

(73) Assignee: TYMPHANY ACOUSTIC TECHNOLOGY LIMITED, Taipei (TW)

( * ) Notice: Subject to any disclaimer, the term of this patent is extended or adjusted under 35 U.S.C. 154(b) by 0 days.

(21) Appl. No.: 17/143,646

(22) Filed: Jan. 7, 2021

(65) Prior Publication Data

US 2021/0211820 A1 Jul. 8, 2021

Related U.S. Application Data

(60) Provisional application No. 62/957,960, filed on Jan. 7, 2020.

(51) Int. Cl.
*H04R 31/00* (2006.01)
*H04R 9/02* (2006.01)
(Continued)

(52) U.S. Cl.
CPC ..... *H04R 31/006* (2013.01); *B29C 45/14467* (2013.01); *C08J 5/24* (2013.01); *C08K 3/04* (2013.01); *C08K 7/06* (2013.01); *C08K 7/14* (2013.01); *H04R 7/12* (2013.01); *H04R 9/025* (2013.01); *H04R 9/046* (2013.01); *H04R 9/06* (2013.01); *H04R 31/003* (2013.01); *B29K 2025/06* (2013.01); *B29K 2075/00* (2013.01);
(Continued)

(58) Field of Classification Search
CPC ...... H04R 31/006; H04R 9/022; H04R 9/025; H04R 2307/021; H04R 2307/029; H04R 2307/025; H04R 2400/11; C08J 5/24
See application file for complete search history.

(56) References Cited

U.S. PATENT DOCUMENTS

| | | | | |
|---|---|---|---|---|
| 6,390,232 B1* | 5/2002 | Kirschbaum | .......... | H04R 7/127 181/166 |
| 2005/0018869 A1* | 1/2005 | Ajiki | .................... | H04R 31/006 381/394 |

(Continued)

*Primary Examiner* — Sunita Joshi
(74) *Attorney, Agent, or Firm* — Muncy, Geissler, Olds & Lowe, P.C.

(57) ABSTRACT

A non-dispensing manufacturing process includes forming a paper cone; engaging the paper cone with a voice coil to form a vibration assembly; fixing a yoke, a magnet set, and a washer to form a magnetic circuit assembly; engaging a basket with the magnetic circuit assembly; and engaging the basket with the vibration assembly to form a speaker, where no glue is used in the manufacturing process. A speaker includes a paper cone; a voice coil engaged with the paper cone to form a vibration assembly, where a junction between a bobbin of the voice coil and the paper cone has a first welding layer; a magnetic circuit assembly including a yoke, a magnet set, and a washer that are integrally fixed; and a basket engaged with the magnetic circuit assembly and the vibration assembly.

19 Claims, 6 Drawing Sheets

(51) Int. Cl.
    *H04R 9/04*     (2006.01)
    *H04R 7/12*     (2006.01)
    *H04R 9/06*     (2006.01)
    *B29C 45/14*     (2006.01)
    *C08J 5/24*     (2006.01)
    *C08K 7/14*     (2006.01)
    *C08K 7/06*     (2006.01)
    *C08K 3/04*     (2006.01)
    *B29L 31/38*     (2006.01)
    *B29K 25/00*     (2006.01)
    *B29K 75/00*     (2006.01)
    *B29K 105/04*     (2006.01)

(52) U.S. Cl.
    CPC ....... *B29K 2105/04* (2013.01); *B29L 2031/38* (2013.01); *C08J 2323/26* (2013.01); *C08J 2367/02* (2013.01); *C08J 2369/00* (2013.01); *C08J 2375/04* (2013.01); *C08J 2379/08* (2013.01); *H04R 2307/021* (2013.01); *H04R 2307/023* (2013.01); *H04R 2307/025* (2013.01); *H04R 2307/029* (2013.01); *H04R 2400/11* (2013.01)

(56) References Cited

U.S. PATENT DOCUMENTS

| | | | |
|---|---|---|---|
| 2006/0147081 A1* | 7/2006 | Mango | H04R 7/125 381/398 |
| 2010/0310111 A1* | 12/2010 | Mihelich | H04R 9/025 381/412 |
| 2019/0166445 A1* | 5/2019 | Itano | H04R 31/003 |
| 2020/0112794 A1* | 4/2020 | Fujitani | H04R 1/10 |

\* cited by examiner

NON-DISPENSING MANUFACTURING PROCESS FOR MAKING SPEAKER AND SPEAKER THEREOF

CROSS REFERENCE TO RELATED APPLICATIONS

The present application claims priority to U.S. provisional application No. 62/957,960, which was filed on Jan. 7, 2020, the entire contents of which are hereby incorporated by reference.

BACKGROUND OF THE INVENTION

Technical Field

The present invention relates to a process for making a speaker and a speaker thereof, and in particular, to a non-dispensing manufacturing process and a speaker manufactured through the non-dispensing manufacturing process.

Related Art

A speaker, also known as a "loudspeaker", is widely welcomed as a personal music device. The speaker mainly includes a vibration system, a magnetic circuit system, and a basket. The magnetic circuit system includes a permanent magnet, a yoke, and a washer. The vibration system includes a paper cone (diaphragm), a voice coil, and a spider. Generally, the diaphragm (paper cone) and a frame, or the diaphragm (paper cone) and a surround are glued with polymer material glue, and the permanent magnet, the yoke, and the washer are also fixed to the bottom of the basket with glue. Because to-be-adhered components are usually materials with a smooth surface, the coated glue has limited adhesion on the smooth surface. In addition, because the glue does not have high heat resistance, a bonding force of a molecular structure decreases in a high temperature environment and the molecular structure is easily broken, and moisture can easily make water-based glue damp and gradually lose a viscosity. A speaker fixed with glue also needs to wait for an organic solvent to volatilize and the glue to solidify, and needs to be processed in stages. This results in a long manufacturing time, and takes up a workshop space to store speaker components to be solidified by the glue.

In addition to the muddying problem of adhesives, the organic solvent used in the glue preparation process causes harm to human respiratory and nervous systems in addition to unpleasant odors during volatilization, and causes great harm to users or production line workers, and may even cause diseases such as cancer or Leukemia.

In addition, in accordance with environmental protection regulations, the disposal of chemical waste needs to be treated first to avoid environmental pollution. Generally, solvents for recycling clean glue are used, but this also leads to an increase in waste disposal costs.

In view of the above, the industry urgently needs a speaker manufacturing process that can reduce a dispensing manufacturing process or even does not require dispensing.

SUMMARY

In view of the above problems in the related art, the present invention provides a non-dispensing manufacturing process for making a speaker and a speaker manufactured through the non-dispensing manufacturing process. In the manufacturing process, no glue is used and no dispensing process is required, so that a finished product during the manufacturing process does not harm an environment and a human body, and there is no degumming phenomenon.

The technical solutions of the present invention are implemented as follows.

According to one aspect of the present invention, a non-dispensing manufacturing process for making a speaker is provided, including: forming a paper cone; engaging the paper cone with a voice coil to form a vibration assembly; fixing a yoke, a magnet set, and a washer to form a magnetic circuit assembly; engaging a basket with the magnetic circuit assembly; and engaging the basket with the vibration assembly to form a speaker, where no glue is used in the above steps of the manufacturing process.

According to this embodiment of the present invention, the step of forming a paper cone includes: forming a cone or a diaphragm; and forming a surround on an outer edge of the cone or the diaphragm through injection molding to form the paper cone.

According to this embodiment of the present invention, the step of forming a cone or a diaphragm includes: forming, through thermoforming, a cone paper of a fiber prepreg covered by a thermoplastic material, to form the cone or the diaphragm of a desired shape.

According to this embodiment of the present invention, the cone paper of the fiber prepreg is a glass fiber prepreg or a carbon fiber prepreg, and the thermoplastic material is polycarbonate, polyethylene terephthalate, polyetherimide, or modified polypropylene.

According to this embodiment of the present invention, the surround is made of a modified thermoplastic elastomer material, including a modified thermoplastic polyurethane elastomer or a modified thermoplastic styrene elastomer.

According to this embodiment of the present invention, the step of engaging the paper cone with a voice coil includes: engaging the paper cone with a bobbin of the voice coil through a welding process.

According to this embodiment of the present invention, the welding process is a laser welding process.

According to this embodiment of the present invention, the step of fixing a yoke, a magnet set, and a washer includes: fastening a locking member passing through a coaxial space of the yoke, a positive magnet of the magnet set, the washer, and a negative magnet of the magnet set with a corresponding fixing member.

According to this embodiment of the present invention, the step of fixing a yoke, a magnet set, and a washer includes: configuring a coaxial space of the yoke, a positive magnet of the magnet set, the washer, and a negative magnet of the magnet set through the plastic material of an injection molding process to fix the yoke, the washer, and the magnet set.

According to this embodiment of the present invention, the step of engaging a basket with the magnetic circuit assembly includes: engaging the basket with the yoke of the magnetic circuit assembly through the plastic material of an injection molding process.

According to this embodiment of the present invention, the step of engaging the basket with the vibration assembly includes: engaging a surround of the vibration assembly with the basket through the plastic material of a laser welding process or an injection molding process.

According to this embodiment of the present invention, the non-dispensing manufacturing process further includes: engaging a connector with the basket through the plastic material of an injection molding process, where the connector is electrically connected to the voice coil.

According to this embodiment of the present invention, the non-dispensing manufacturing process further includes: connecting a spider to the voice coil and the basket through an injection molding process or a laser welding process.

According to this embodiment of the present invention, the injection molding process is a co-molding process.

According to another aspect of the present invention, a speaker manufactured through a non-dispensing manufacturing process is provided, including: a paper cone; a voice coil, the voice coil being engaged with the paper cone to form a vibration assembly, where a junction between a bobbin of the voice coil and the paper cone has a first welding layer formed through a welding process; a magnetic circuit assembly including a yoke, a magnet set, and a washer that are integrally fixed; and a basket, the basket being engaged with the magnetic circuit assembly and the vibration assembly, where a junction between the basket and the magnetic circuit assembly has an injection engager formed through an injection molding process, and the junction between the basket and the magnetic circuit assembly has a second welding layer formed through the welding process.

According to this embodiment of the present invention, the paper cone includes: a cone; and a surround formed on an outer edge of the cone through the injection molding process.

According to this embodiment of the present invention, the cone is formed, through thermoforming, by a cone paper of a fiber prepreg covered by a thermoplastic material.

According to this embodiment of the present invention, the cone paper of the fiber prepreg is a glass fiber prepreg or a carbon fiber prepreg, and the thermoplastic material is polycarbonate, polyethylene terephthalate, polyetherimide, or modified polypropylene.

According to this embodiment of the present invention, the surround is made of a modified thermoplastic elastomer material, including a modified thermoplastic polyurethane elastomer or a modified thermoplastic styrene elastomer.

According to this embodiment of the present invention, the magnet set includes a positive magnet and a negative magnet, and the magnetic circuit assembly further includes a locking member passing through one end of a coaxial space of the yoke, the positive magnet, the washer, and the negative magnet, and a corresponding fixing member, the locking member and the fixing member being fixed in a fitting manner.

According to this embodiment of the present invention, the magnet set includes a positive magnet and a negative magnet, the magnetic circuit assembly further includes a plastic fixing member passing through a coaxial space of the yoke, the positive magnet, the washer, and the negative magnet, and the plastic fixing member is formed through the injection molding process.

According to this embodiment of the present invention, the speaker further includes a connector electrically connected to the voice coil, where the connector is engaged with the basket through the plastic material formed by the injection molding process.

According to this embodiment of the present invention, the speaker further includes a spider connected between the voice coil and the basket, where the spider is connected between the voice coil and the basket through a laser welding layer formed by a laser welding process.

According to this embodiment of the present invention, the welding process is a laser welding process.

According to this embodiment of the present invention, the injection molding process is a co-molding process.

The speaker obtained through the non-dispensing manufacturing process of the present invention is more environmentally friendly in the production process and does not cause harm to consumers and manufacturers, can effectively reduce the concentration of volatile organic compounds in the air, and there is no need to wait for a long time for glue to solidify. When the assemblies are bonded, there are no unnecessary consumables and material waste, no dust, no overflow, and no degumming phenomenon, and the non-dispensing manufacturing process can replace a traditional glue production method. In addition, because the cone or the diaphragm of the present invention uses a high-rigidity thermoplastic carbon fiber prepreg or glass fiber prepreg instead of a traditional high-pitched aluminum film, it can be ensured that the vibration assembly has good adhesion and functional characteristics through co-injection molding. After the speaker is formed through assembling, there is a good frequency response curve after an environmental test and a power test, and even a treble frequency can be extended to 35 KHz, which is enough to replace a general aluminum speaker.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention shall fall within the protection scope of the present invention.

FIG. 1 to FIG. 6 are schematic flowcharts of a non-dispensing manufacturing process for making a speaker according to an embodiment of the present invention. The non-dispensing manufacturing process mainly includes the following steps:

Step S10: Form a paper cone.

Step S20: Engage the paper cone with a voice coil to form a vibration assembly.

Step S30: Fix a yoke, a magnet set, and a washer to form a magnetic circuit assembly.

Step S40: Engage a basket with the magnetic circuit assembly.

Step S50: Engage the basket with the vibration assembly to form a speaker.

No glue is used in the above steps of the manufacturing process. Details are as follows.

Figure 1:
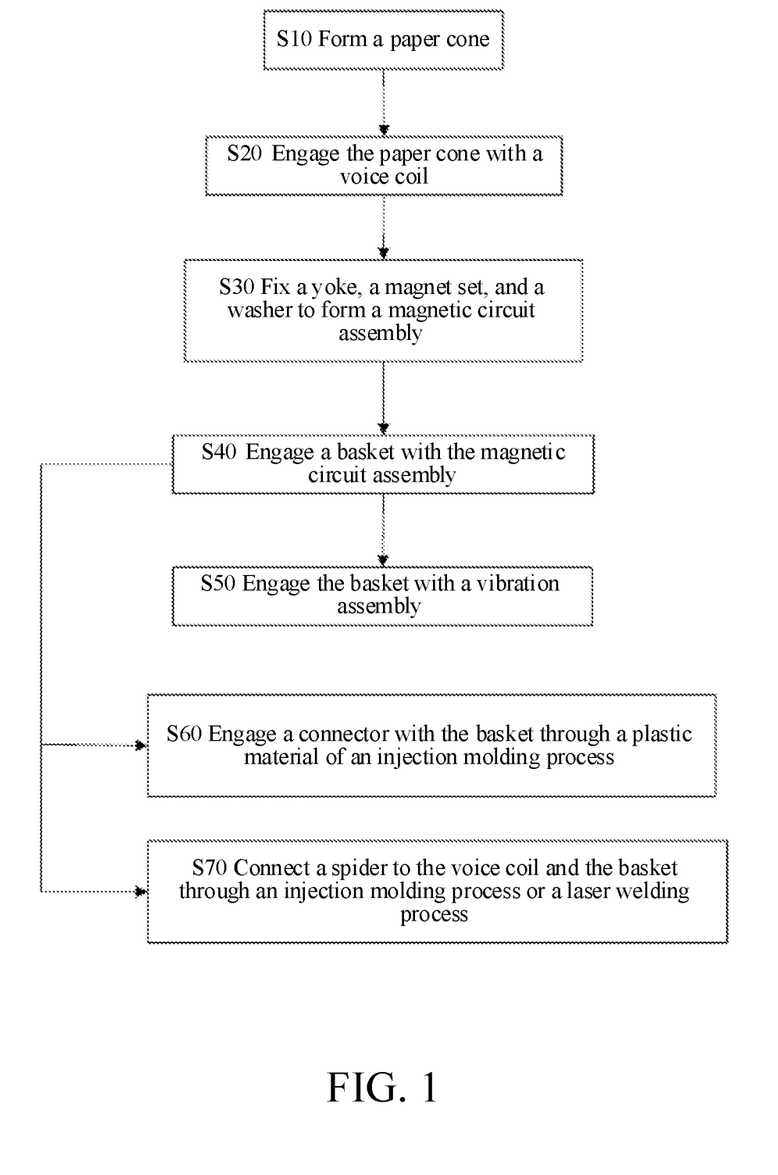
FIG. 1 to FIG. 6 are schematic flowcharts of a non-dispensing manufacturing process for making a speaker according to an embodiment of the present invention.

Step S10 of forming a paper cone includes: step S11: forming a cone or a diaphragm; and step S12: forming a surround on an outer edge of the cone or the diaphragm through injection molding.

Step S11 of forming a cone or a diaphragm includes: step 111: forming, through thermoforming, a cone paper of a fiber prepreg covered by a thermoplastic material, to form the cone or the diaphragm with a desired shape. The cone paper of the fiber prepreg is a thermoplastic glass fiber prepreg or a thermoplastic carbon fiber prepreg, and the thermoplastic material is polycarbonate, polyethylene terephthalate, polyetherimide, polyphenylene ether, or modified polypropylene. The modified polypropylene includes a mixture of polypropylene, polyurethane, and carbon fiber.

In step S12 of forming a surround on an outer edge of the cone or the diaphragm through injection molding, the cone or the diaphragm is placed, and the surround is formed on the outer edge of the cone or the diaphragm through a co-molding process, where the surround is formed by a modified thermoplastic elastomer material, including a modified thermoplastic polyurethane elastomer or a modified thermoplastic styrene elastomer, and the modified thermoplastic polyurethane elastomer includes a mixture of a thermoplastic polyurethane elastomer, polycarbonate or polyethylene terephthalate, or polyetherimide. The surround of the present invention has a tensile strength between 30 MPa and 80 MPa, and hardness between 65 Shore A and 95 Shore A. Therefore, the paper cone in this embodiment has the high-rigidity cone or diaphragm and the high-elastic surround without a dispensing manufacturing process.

Figure 2:
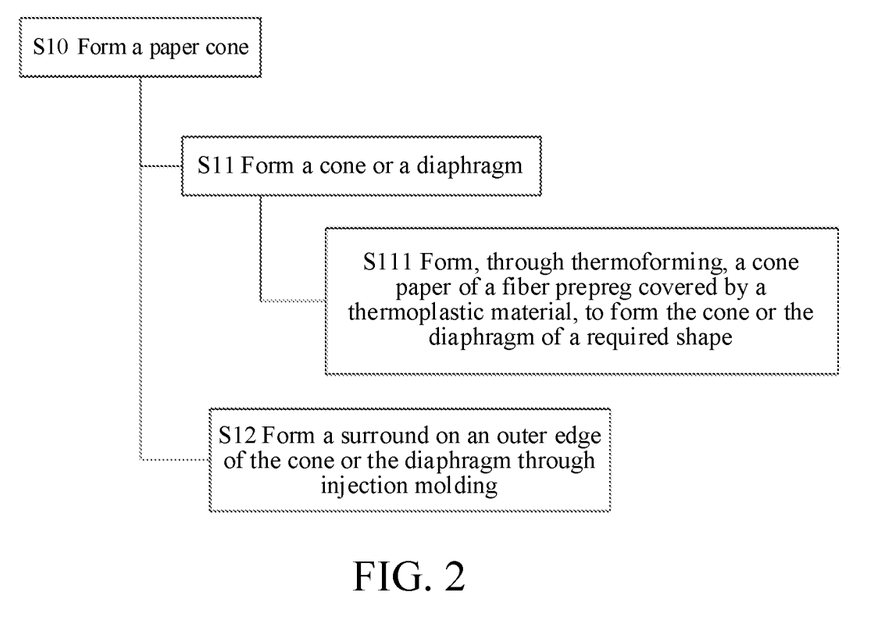

Step S20 of engaging the paper cone with a voice coil includes: step S21: engaging the paper cone with a bobbin of the voice coil through a welding process, where the welding process may be a soldering process, an ultrasonic welding process, or a laser welding process.

Figure 3:
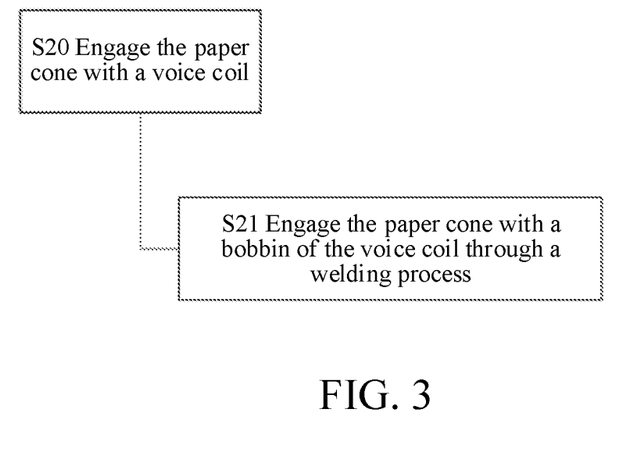

In step S30 of fixing a yoke, a magnet set, and a washer to form a magnetic circuit assembly, the magnet set includes a positive magnet and a negative magnet, and the yoke may be a U-yoke. Step 30 includes: step S31: tightly fastening a bolt/locking member passing through a coaxial space of the yoke, the positive magnet, the washer, and the negative magnet with a corresponding nut for locking each other, so as to fix the magnetic circuit assembly including the yoke, the positive magnet, the washer, and the negative magnet; alternatively, step S32 may be processed: configuring a coaxial space of the yoke, the positive magnet, the washer, and the negative magnet through the plastic material of an injection molding process to fix the magnetic circuit assembly including the yoke, the positive magnet, the washer, and the negative magnet through solidification of the plastic material. The above bolt-nut and injection molding processes can be completed through, including but not limited to, welding, riveting, and other processes, and are also covered by the protection concept of the present invention.

Figure 4:
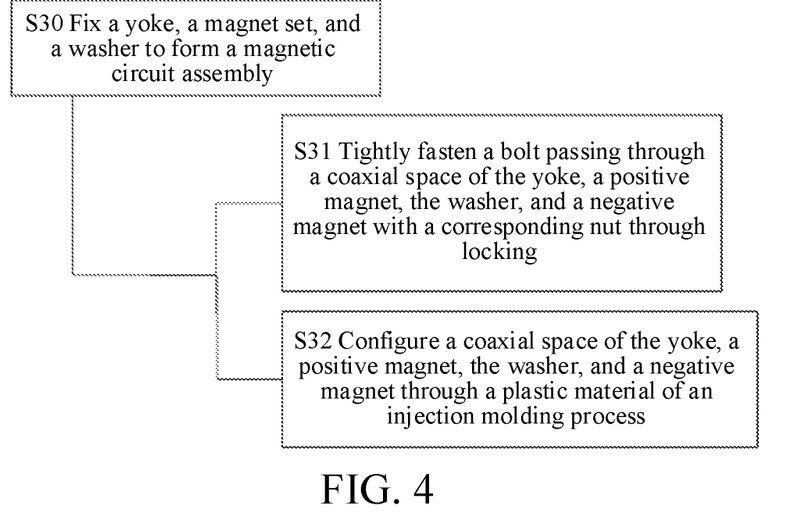

Step S40 of engaging a basket with the magnetic circuit assembly includes step S41: engaging the basket with the yoke of the magnetic circuit assembly through the plastic material of the injection molding process, where the injection molding process can be completed by, including but not limited to, co-molding, welding, soldering, and other processes.

Figure 5:
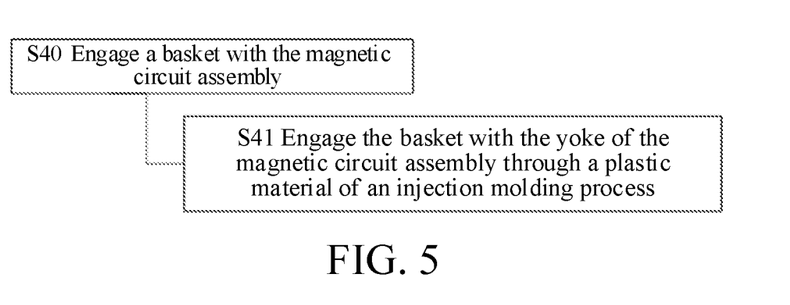

Step S50 of engaging the basket with the vibration assembly includes step S51: engaging a surround of the vibration assembly with the basket through a laser welding process, or engaging a surround of the vibration assembly with the basket through the plastic material of an injection molding process, where the injection molding process may be the co-molding process.

Figure 6:
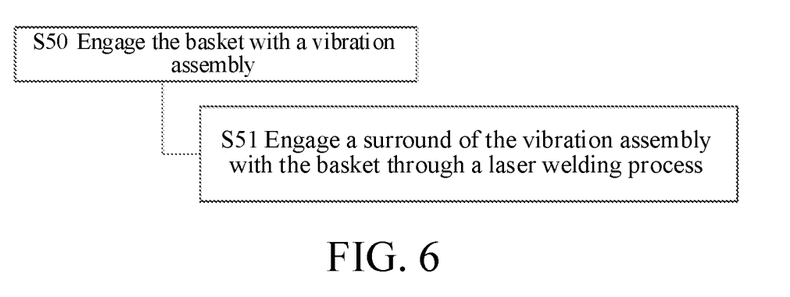

Further, the non-dispensing manufacturing process for making a speaker in the present invention may further include step S60: engaging a connector with the basket through the plastic material of an injection molding process, where the connector is electrically connected to the voice coil to transmit a signal.

Further, the non-dispensing manufacturing process for making a speaker in the present invention may further include step S70: connecting a spider to the voice coil and the basket through an injection molding process or a laser welding process. Similarly, depending on designs, a dust-proof cover is connected to the cone through the injection molding process or the laser welding process.

Figure 8:
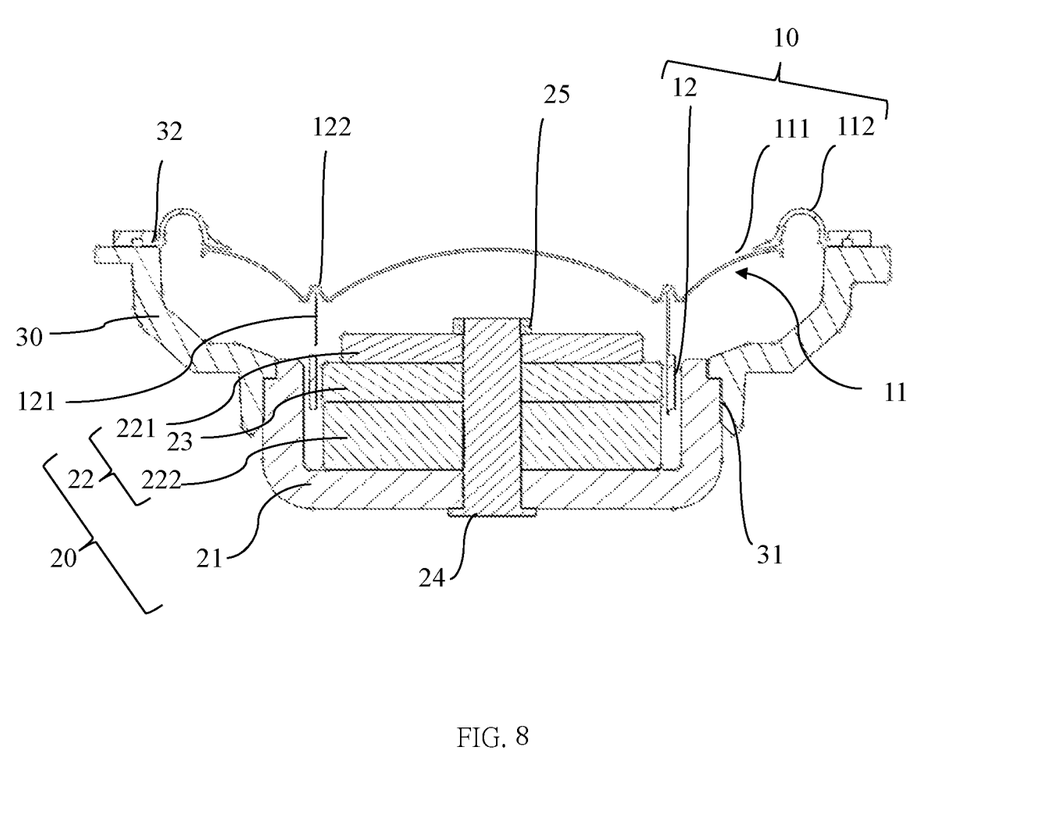
FIG. 8 is a schematic cross-sectional view of a speaker according to an embodiment of the present invention.

The present invention further includes a speaker 10 manufactured through a non-dispensing manufacturing process, including at least a paper cone 11, a voice coil 12, a magnetic circuit assembly 20, and a basket 30.

Figure 7:
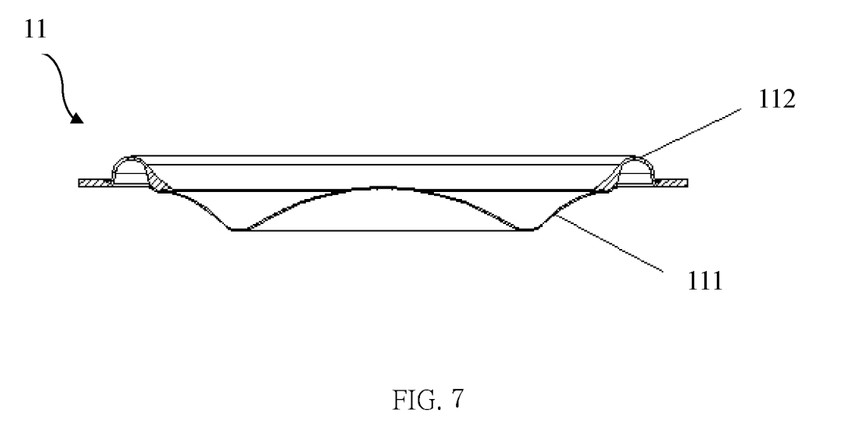
FIG. 7 is a schematic cross-sectional view of a paper cone of a speaker manufactured through a non-dispensing manufacturing process according to an embodiment of the present invention.

The paper cone 11 includes a cone 111 (the cone is used as an example, and may also be a diaphragm) and a surround 112. The surround 112 is formed on an outer edge of the cone 111 through an injection molding process, where in the injection molding process, the cone 111 is placed in a mold cavity, and the surround 112 is formed on the outer edge of the cone 111 through a co-molding process. The surround 112 is formed by a modified thermoplastic elastomer material, including a modified thermoplastic polyurethane elastomer or a modified thermoplastic styrene elastomer, and the modified thermoplastic polyurethane elastomer includes a mixture of a thermoplastic polyurethane elastomer, polycarbonate or polyethylene terephthalate, or polyetherimide. The surround 112 of the present invention has a tensile strength between 30 MPa and 80 MPa, and hardness between 65 Shore A and 95 Shore A. The cone 111 is formed, through thermoforming, by a cone paper of a fiber prepreg covered by a thermoplastic material. The cone paper of the fiber prepreg is a thermoplastic glass fiber prepreg or a thermoplastic carbon fiber prepreg, and the thermoplastic material is polycarbonate, polyethylene terephthalate, polyetherimide, polyphenylene ether, or modified polypropylene. The modified polypropylene includes a mixture of polypropylene, polyurethane, and carbon fiber. Therefore, the paper cone 11 in this embodiment has the high-rigidity cone 111 and the high-elastic surround 112 without the need for a dispensing manufacturing process.

The voice coil 12 is engaged with the paper cone 11 to form a vibration assembly 10, where a junction between a bobbin 121 of the voice coil 12 and the paper cone 11 has a first welding layer 122 formed through a welding process, and the welding process is a laser welding process.

The magnetic circuit assembly 20 includes a yoke 21 (which is a U-yoke in this embodiment), a magnet set 22, and a washer 23 that are integrally fixed, where the magnet set 22 includes a positive magnet 221 and a negative magnet 222. Further, the magnetic circuit assembly 20 further includes a bolt/locking member 24 passing through one end of a coaxial space of the yoke 21, the positive magnet 221, the washer 23, and the negative magnet 222, and a corresponding nut 25 at the other end of the coaxial space, the bolt and the nut being tightly locked to fix the magnetic circuit assembly 20 including the yoke 21, the positive magnet 221, the washer 23, and the negative magnet 222.

The magnetic circuit assembly 20 may also include a plastic fixing member that is formed through an injection molding process and that passes through a coaxial space of the yoke 21, the positive magnet 221, the washer 23, and the negative magnetic magnet 222, to fix the magnetic circuit assembly 20 including the yoke 21, the positive magnet 221, the washer 23, and the negative magnet 222 through solidification of the plastic fixing member. The above bolt-nut and injection molding processes can be completed through, including but not limited to, welding, riveting, and other processes, and are also covered by the protection concept of the present invention.

The basket 30 is engaged with the magnetic circuit assembly 20 and the vibration assembly 10, where a junction between the basket 30 and the yoke 21 of the magnetic circuit assembly has an injection engager 31 formed through an injection molding process, and a junction between the basket 30 and the surround 112 of the magnetic circuit assembly 10 has a second welding layer 32 formed through the welding process. The injection molding process can be completed by, including but not limited to, co-molding, welding, soldering, and other processes, and the welding process is a laser welding process. Alternatively, the basket may be engaged with the surround 112 and the basket 30 of the vibration assembly 10 through the plastic material of an injection molding process, where the injection molding process may be co-molding.

Figure 9:
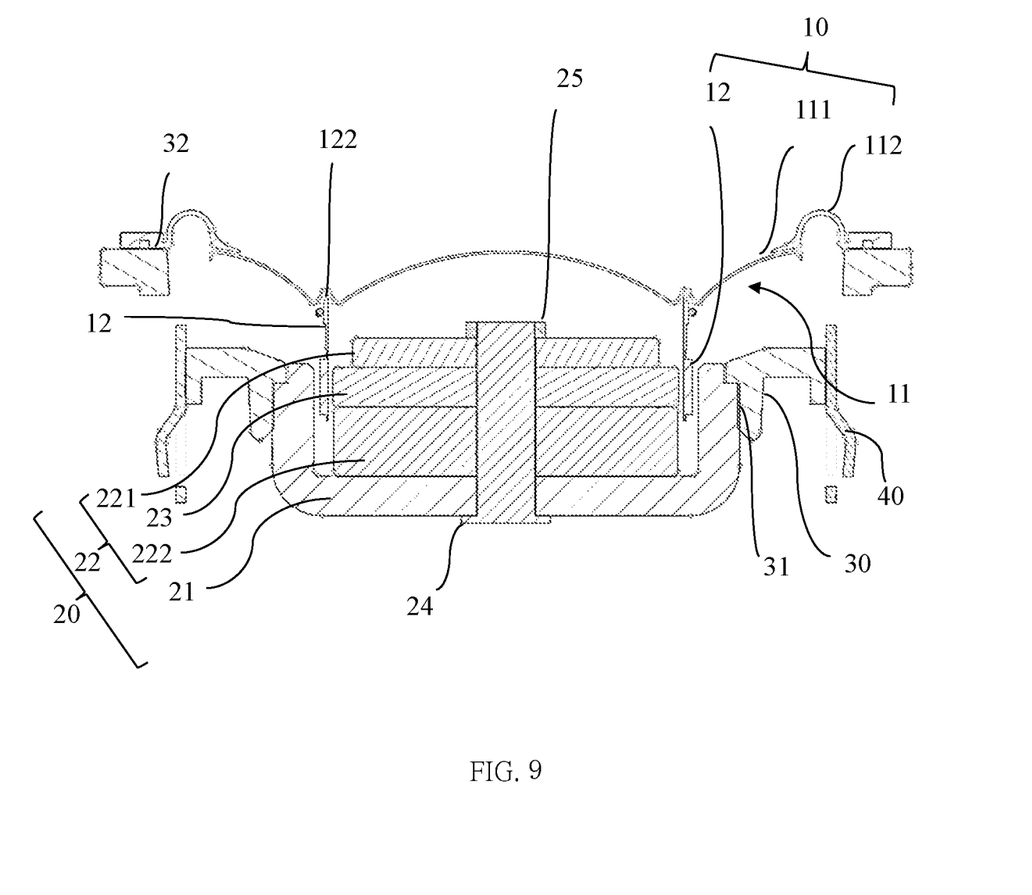
FIG. 9 is a schematic cross-sectional view of a speaker equipped with a connector according to an embodiment of the present invention.

Further, the speaker of the present invention further includes a connector 40 electrically connected to the voice coil 12, where the connector 40 is electrically connected to the voice coil 12 to transmit a signal, and the connector 40 is engaged with the basket 30 through the plastic material formed by the injection molding process.

Further, the speaker of the present invention further includes a spider connected between the voice coil 12 and the basket 30, where the spider is connected between the voice coil 12 and the basket 30 through a laser welding layer formed by a laser welding process, or the spider may be connected between the voice coil 12 and the basket 30 through an injection molding process.

Similarly, depending on the designs, the cone may be formed with a dustproof cover, and the dustproof cover may be connected to the cone 111 through the injection molding process or the laser welding process.

The speaker obtained through the non-dispensing manufacturing process of the present invention is more environmentally friendly in the production process and does not cause harm to consumers and manufacturers, which can effectively reduce the concentration of volatile organic compounds (VOC) in the air, and there is no need to wait for a long time for glue to solidify. When the assemblies are bonded, there are no unnecessary consumables and material waste, no dust, no overflow, and no degumming phenomenon, and the non-dispensing manufacturing process can replace a traditional glue production method. In addition, because the cone or the diaphragm of the present invention uses a high-rigidity thermoplastic carbon fiber prepreg or glass fiber prepreg instead of a traditional high-pitched aluminum film, it can be ensured that the vibration assembly has good adhesion and functional characteristics through co-injection molding. After the speaker is formed through assembling, there is a good frequency response curve after an environmental test and a power test, and even a treble frequency can be extended to 35 KHz, which is enough to replace a general aluminum-film speaker.

The foregoing descriptions are merely preferred embodiments of the present invention, but are not intended to limit the present invention. Any modification, equivalent replacement, or improvement made within the spirit and principle of the present invention shall fall within the protection scope of the present invention.

What is claimed is:

1. A non-dispensing manufacturing process for making a speaker, comprising:
   forming a paper cone;
   engaging the paper cone with a voice coil to form a vibration assembly;
   fixing a yoke, a magnet set, and a washer to form a magnetic circuit assembly;
   engaging a basket with the yoke of the magnetic circuit assembly through the plastic material of an injection molding process, free from engaging the basket with the magnet set and the washer; and
   engaging the basket with the vibration assembly to form a speaker,
   wherein no glue is used in said non-dispensing manufacturing process.

2. The non-dispensing manufacturing process according to claim 1, wherein said forming the paper cone comprises:
   forming a cone or a diaphragm; and
   forming a surround on an outer edge of the cone or the diaphragm through injection molding to form the paper cone.

3. The non-dispensing manufacturing process according to claim 2, wherein said forming the cone or the diaphragm comprises forming, through thermoforming, a cone paper of a fiber prepreg covered by a thermoplastic material, to form the cone or the diaphragm with a desired shape.

4. The non-dispensing manufacturing process according to claim 3, wherein the cone paper of the fiber prepreg is a glass fiber prepreg or a carbon fiber prepreg, and the thermoplastic material is polycarbonate, polyethylene terephthalate, polyetherimide, or modified polypropylene.

5. The non-dispensing manufacturing process according to claim 2, wherein the surround is made of a modified thermoplastic elastomer material comprising a modified thermoplastic polyurethane elastomer or a modified thermoplastic styrene elastomer.

6. The non-dispensing manufacturing process according to claim 1, wherein said engaging the paper cone with the voice coil comprises engaging the paper cone with a bobbin of the voice coil through a welding process.

7. The non-dispensing manufacturing process according to claim 6, wherein the welding process is a laser welding process.

8. The non-dispensing manufacturing process according to claim 1, wherein said fixing the yoke, the magnet set, and the washer comprises fastening a locking member passing through a coaxial space of the yoke, a positive magnet of the magnet set, the washer, and a negative magnet of the magnet set with a corresponding fixing member.

9. The non-dispensing manufacturing process according to claim 1, wherein said fixing the yoke, the magnet set, and the washer comprises configuring a coaxial space of the yoke, a positive magnet of the magnet set, the washer, and a negative magnet of the magnet set through the plastic material of an injection molding process to fix the yoke, the washer, and the magnet set.

10. The non-dispensing manufacturing process according to claim 1, wherein said engaging the basket with the vibration assembly comprises engaging a surround of the vibration assembly with the basket through the plastic material of a laser welding process or an injection molding process.

11. The non-dispensing manufacturing process according to claim 1, further comprising engaging a connector with the basket through the plastic material of an injection molding process, wherein the connector is electrically connected to the voice coil.

12. The non-dispensing manufacturing process according to claim 1, wherein the injection molding process is a co-molding process.

13. A speaker manufactured through a non-dispensing manufacturing process, comprising:
a paper cone;
a voice coil engaged with the paper cone to form a vibration assembly, wherein a junction between a bobbin of the voice coil and the paper cone has a first welding layer;
a magnetic circuit assembly comprising a yoke, a magnet set, and a washer that are integrally fixed; and
a basket engaged with the yoke of the magnetic circuit assembly and the vibration assembly and free from being engaged with the magnet set and the washer, wherein a junction between the basket and the yoke of the magnetic circuit assembly has an injection engager, and the junction between the basket and the vibration assembly has a second welding layer.

14. The speaker according to claim 13, wherein the paper cone comprises:
a cone; and
a surround formed on an outer edge of the cone.

15. The speaker according to claim 14, wherein the cone comprises a cone paper of a fiber prepreg covered by a thermoplastic material.

16. The speaker according to claim 14, wherein the cone paper of the fiber prepreg is a glass fiber prepreg or a carbon fiber prepreg, and the thermoplastic material is polycarbonate, polyethylene terephthalate, polyetherimide, or modified polypropylene.

17. The speaker according to claim 14, wherein the surround is made of a modified thermoplastic elastomer material comprising a modified thermoplastic polyurethane elastomer or a modified thermoplastic styrene elastomer.

18. The speaker according to claim 13, wherein the magnet set comprises:
a positive magnet; and
a negative magnet, and
wherein the magnetic circuit assembly further comprises a locking member passing through one end of a coaxial space of the yoke, the positive magnet, the washer, and the negative magnet, and a corresponding fixing member, the locking member and the fixing member being fixed with each other.

19. The speaker according to claim 13, further comprising a connector electrically connected to the voice coil, wherein the connector is engaged with the basket through the plastic material formed by the injection molding process.

* * * * *